(12) United States Patent
Han et al.

(10) Patent No.: US 11,093,406 B2
(45) Date of Patent: *Aug. 17, 2021

(54) METHOD AND DEVICE FOR STORAGE MANAGEMENT

(71) Applicant: EMC IP Holding Company LLC, Hopkinton, MA (US)

(72) Inventors: Geng Han, Beijing (CN); Jian Gao, Beijing (CN); Wayne Weihua Li, Beijing (CN); Jamin Kang, Beijing (CN); Jibing Dong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/846,673

(22) Filed: Apr. 13, 2020

(65) Prior Publication Data

US 2020/0257636 A1 Aug. 13, 2020

Related U.S. Application Data

(63) Continuation of application No. 15/954,812, filed on Apr. 17, 2018, now Pat. No. 10,657,066.

(30) Foreign Application Priority Data

Apr. 17, 2017 (CN) .......................... 201710250388.4

(51) Int. Cl.
*G06F 12/10* (2016.01)
*G06F 12/02* (2006.01)
*G06F 12/1009* (2016.01)

(52) U.S. Cl.
CPC ...... *G06F 12/1009* (2013.01); *G06F 12/0246* (2013.01); *G06F 2212/1008* (2013.01); *G06F 2212/1016* (2013.01); *G06F 2212/657* (2013.01); *G06F 2212/7203* (2013.01)

(58) Field of Classification Search
CPC ............. G06F 12/1009; G06F 12/0246; G06F 2212/1008; G06F 2212/1016; G06F 2212/657; G06F 2212/7203
See application file for complete search history.

(56) References Cited

U.S. PATENT DOCUMENTS

| | | |
|---|---|---|
| 7,130,956 B2 | 10/2006 | Rao |
| 9,898,410 B2 | 2/2018 | Cheriton |
| 2014/0006538 A1 | 1/2014 | Oikonomou |
| 2014/0244929 A1 | 8/2014 | Acharya et al. |
| 2017/0124168 A1 | 5/2017 | Ullrich et al. |

FOREIGN PATENT DOCUMENTS

| | | |
|---|---|---|
| CN | 101615146 | 12/2009 |
| CN | 103927130 | 7/2014 |
| CN | 104102585 | 10/2014 |
| CN | 106201916 | 12/2016 |
| KR | 101716865 | 3/2017 |

*Primary Examiner* — Masud K Khan
(74) *Attorney, Agent, or Firm* — BainwoodHuang

(57) ABSTRACT

In a method and apparatus for storage management, a method includes: creating a plurality of profiles for address mapping, the profiles comprising a part of mapping relation in the total mapping table and creating an index for a part of the plurality of profiles to accelerate the lookup speed. A corresponding device and computer program product are also disclosed.

20 Claims, 5 Drawing Sheets

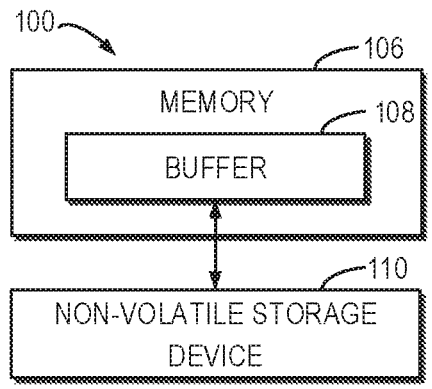
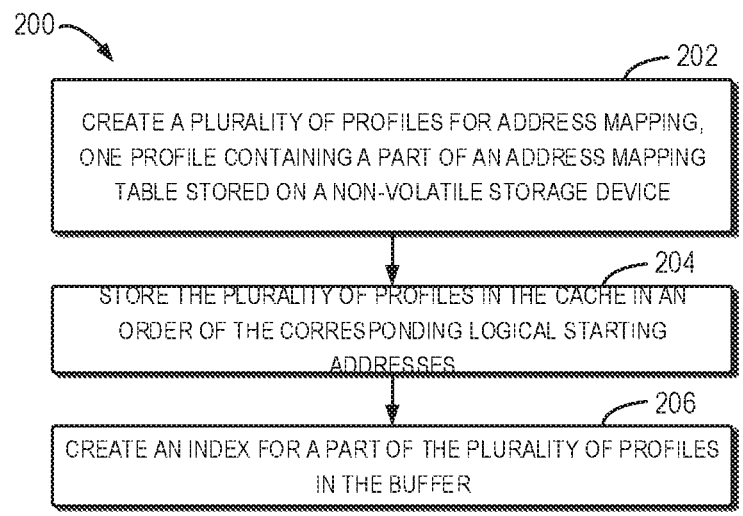
FIG. 1
FIG. 2

METHOD AND DEVICE FOR STORAGE MANAGEMENT

RELATED APPLICATIONS

This application claim priority from Chinese Patent Application Number CN201710250388.4, filed on Apr. 17, 2017 at the State Intellectual Property Office, China, titled "METHOD AND DEVICE FOR STORE MANAGEMENT" the contents of which is herein incorporated by reference in its entirety.

FIELD

Embodiments of the present disclosure generally relate to storage management, and more specifically, to a method and device for data storage.

BACKGROUND

Mapping between logical space and physical space is a classic topic of computer science. Mapping can provide virtualization to non-continuous physical space. With the virtualization, the following benefits can be obtained: several isolated continuous logical spaces, each space starting at the same logical address; in combination with the on-demand allocation or thin provisioning technology, a total logical capacity larger than the physical capacity can be obtained. Generally, the address mapping table is used to record the mapping relation between the logical block address and physical block address. As the address mapping table is usually large, it is stored on a non-volatile storage device, which is not easy for quick access.

SUMMARY

Embodiments of the present disclosure provide a method and device for storage management and a corresponding computer program product.

According to a first aspect of the present disclosure, there is provided a method for storage management, the method comprising: creating a plurality of profiles for address mapping, a profile containing a part of an address mapping table stored on a non-volatile storage device and the profile indicating: a logical address of an initial logical block of a plurality of logical blocks, a physical starting address corresponding to the logical starting address, the number of the plurality of logical blocks; and a modification flag bit indicating whether the profile is changed with respect to the address mapping table; storing the plurality of profiles in a cache in an order of the corresponding logical starting addresses; and creating an index for a part of the plurality of profiles in the cache.

According to a second aspect of the present disclosure, there is provided an electronic device, the device comprising: a processor; a memory coupled with the processor, the memory having instructions stored therein, the instructions, when executed by the processor, causing the electronic device to implement acts, the acts comprising: creating a plurality of profiles for address mapping, a profile containing a part of an address mapping table stored on a non-volatile storage device and the profile indicating: a logical address of an initial logical block of a plurality of logical blocks, a physical starting address corresponding to the logical starting address, the number of the plurality of logical blocks; and a modification flag bit indicating whether the profile is changed with respect to the address mapping table; storing the plurality of profiles in a cache in an order of the corresponding logical starting addresses; and creating an index for a part of the plurality of profiles in the cache.

A third aspect of the present disclosure provides a computer readable medium. The computer readable medium stores instructions, the instructions, when executed by at least one processing unit, causing the at least one processing unit to implement the method according to the embodiments of the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description to the example embodiments of the present disclosure with reference to the accompanying drawings, the above and other objectives, features, and advantages of the present disclosure will become more apparent. In the example embodiments of the present disclosure, the same reference signs generally represent the same components.

FIG. 1 is a schematic diagram illustrating a storage management environment according to embodiments of the present disclosure;

FIG. 2 is a flowchart illustrating a process or method for storage management according to embodiments of the present disclosure;

DETAILED DESCRIPTION OF EMBODIMENTS

Figure 3:
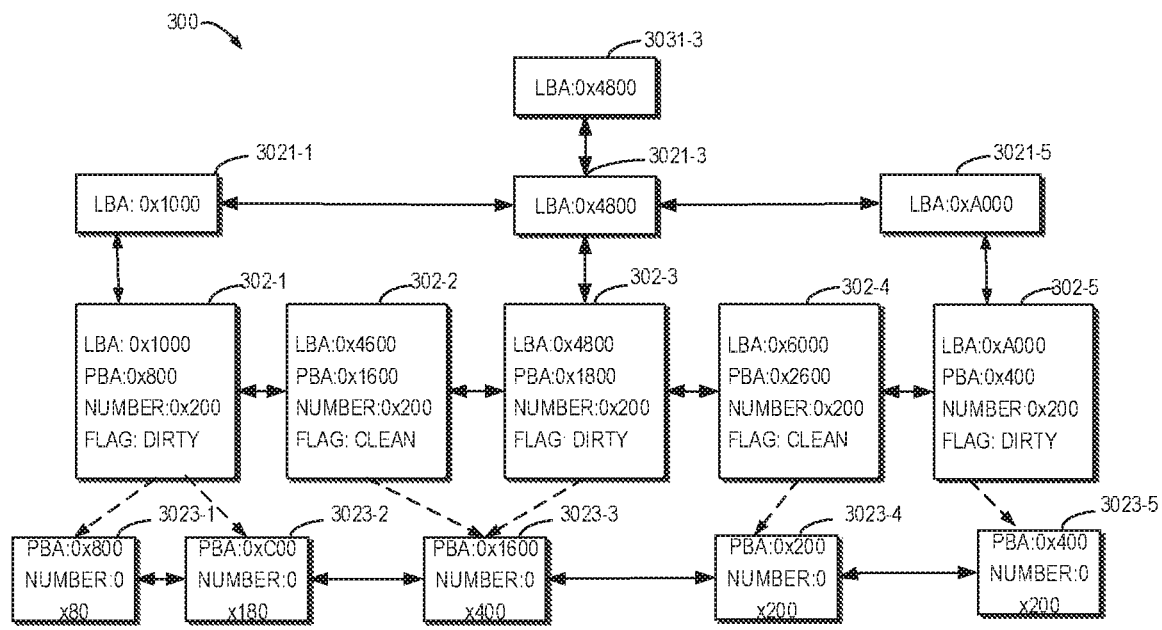
FIG. 3 is a block diagram illustrating an address mapping cache structure according to embodiments of the present disclosure.

Example embodiments of the present disclosure will be described in the following text in greater details with reference to the drawings. Although example embodiments of the present disclosure are displayed in the drawings, it is to be understood that the present disclosure can be implemented in various manners, not limited to the embodiments illustrated herein. On the contrary, these embodiments are provided to make the present disclosure more thorough and complete, and convey the scope of the present disclosure completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an example embodiment" are to be read as "at least one example embodiment." The term "another embodiment" is to be read as "at least one another embodiment." Terms "a first", "a second" and others can represent different or identical objects. The following text may also contain other explicit or implicit definitions.

In the present disclosure, the term "logical block" means that the logical storage space is divided into continuous logical units, each logic unit being called a "logical block." Each logical block has a unique logical address which is called "Logical Block Address (LBA)."

In the present disclosure, the term "physical block" means that the physical storage space is divided into a plurality of physical units, each physical unit being called a "physical block." Each physical block has a unique physical address which is called "Physical Block Address." The term "physical extent" refers to physical storage space including a plurality of continuous physical blocks.

In the present disclosure, the term "address mapping table" refers to a table recording the address relationships between LBA and PBA.

As stated above, the address mapping table is used to record address mapping relationships between LBA and PBA. The storage space occupied by the address mapping table generally exceeds the capacity of the memory and thus, the address mapping tale is stored on a non-volatile storage device, such as a hard disk. During operation, mapping between LBA and PBA changes dynamically. It is desirable to speeding up accessing the address mapping table.

To solve, at least in part, the above and other potential problems and defects, embodiments of the present disclosure provide a method for storage management. According to the embodiments of the present disclosure, a part of the address mapping table is stored in the cache of the memory. Embodiments of the present disclosure have at least the following advantages: improving the utilization efficiency of the memory; saving storage space; improving lookup efficiency of the address mapping relation; and easy maintenance of data structure in the cache.

FIG. 1 is a schematic diagram illustrating an environment 100 in which embodiments of the present disclosure can be implemented. The environment 100 may include a memory 106 and a non-volatile storage device (such as hard disk) 110. The memory 106 includes a cache 108 in which the address mapping cache structure according to embodiments of the present disclosure can be implemented. It shall be appreciated that the numbers of the memory 106, the non-volatile storage device 110 and the cache 108 shown in FIG. 1 are illustrative.

FIG. 2 is a flowchart illustrating a process or method 200 for storage management according to embodiments of the present disclosure. Now, FIG. 2 will be further depicted with reference to an address mapping cache structure 300 shown in FIG. 3.

At 202, a plurality of profiles 302-1, 302-2, 303-3, 302-4 and 302-5 (collectively referred to as profile 302) for address mapping are created. A profile 302 includes a part of an address mapping table stored on a non-volatile storage device 110, and indicates a logical starting address of an initial logical block of a plurality of logical blocks, a physical starting address corresponding to the logical starting address, the number of a plurality of logical blocks, and a modification flag bit which indicates whether the profile has any changes with respect to the address mapping table.

As an example, as shown in FIG. 3, the profile 302-1 indicates that the logical starting address of the initial logical block of the plurality of logical blocks is 0x1000; the physical starting address corresponding to the logical starting address is 0x800; the number of the plurality of logical blocks is 20; the modification flag bit is "dirty", which indicates that the profile 302-1 is changed with respect to the address mapping table. It shall be appreciated that if the modification flag bit is "clean," it indicates that the profile are not changed with respect to the address mapping table. It is to be understood that the number of profile 302 shown in FIG. 3 is only illustrative, rather than limiting. Besides, the values of the logical starting address, the physical starting address, the number of logical blocks, the modification flag bit and the like in the plurality of profiles 302-1, 302-2, 302-3, 302-4 and 302-5 shown in FIG. 3 are all illustrative, not limiting.

At 204, the plurality of profiles 302-1, 302-2, 302-3, 302-4 and 302-5 are stored in cache 108 in an order of the corresponding logical starting addresses. By way of example, as illustrated in FIG. 3, the plurality of profiles 302-1, 302-2, 302-3, 302-4 and 302-5 are sorted in an ascending order of the logical starting addresses. It shall be appreciated that the plurality of profiles 302-1, 302-2, 302-3, 302-4 and 302-5 can also be sorted according to the descending order of the logical starting addresses.

At 206, an index can be created in cache 108 for a part of the plurality of profiles 302-1, 302-2, 302-3, 302-4 and 302-5. By way of example, as illustrated in FIG. 3, indexes 3021-1, 3021-3 and 3021-5 are created for profiles 302-1, 302-3 and 302-5. In some embodiments, indexes 3021-1, 3021-3 and 3021-5 indicate the logical starting addresses of the respective profiles, respectively. In some embodiments, a second-level index 3031-3 can be created.

Those skilled in the art shall appreciate that there are a plurality of methods for creating indexes for a part of the plurality of profiles 302-1, 302-2, 302-3, 302-4 and 302-5. For example, in some embodiments, the part of profiles can be selected randomly. Only as an illustrative example, in response to the profile 302-1 being stored in the cache 108, a random number is generated. If the generated random number is an even number, then an index for profile 302-1 is created. In some embodiments, based on the access frequency, the part of profiles is selected. It shall be appreciated that the above method is only an illustrative, rather than limiting embodiments of the present disclosure.

In some embodiments, a record 3023 for a physical extent is created. The record indicates the physical starting address of the physical extent and the number of physical blocks contained therein. The at least part of the plurality of logical blocks indicated by one of the profiles 302 are mapped to the physical extent. By way of example, FIG. 3 illustrates a plurality of records 3023-1, 3023-2, 3023-3, 3023-4 and 3023-5 (collectively referred to as "record 3023"). It shall be appreciated that the number of records illustrated in FIG. 3 is illustrative, rather than limiting. Only as an example, the record 3023-1 indicates that the physical starting address of the starting physical block of the corresponding physical extent is 0x800, and the physical extent includes 80 physical blocks. It shall be appreciated that the values of the physical starting address and the physical blocks in the record shown in FIG. 3 are illustrative, rather than limiting.

In some embodiments, the plurality of logical blocks indicated by one profile 302 are mapped to a plurality of physical extents. As shown in FIG. 3, records 3023-1 and 3023-3 indicate the physical addresses of the starting physical blocks of the two physical extents that the logical block indicated by the profile 302-1 is mapped to, and the number of physical blocks included in each of the two physical extents, respectively.

In some embodiments, if the physical end address of one record records and the physical starting address of the next record are continuous in a plurality of records, then the record and the next record are merged. By way of example, the record 3023-3 shown in FIG. 3 is obtained by merging two adjacent physical extent nodes (not shown). Therefore, the record 3023-3 indicates the physical address of the starting physical block of the physical extent that the logical blocks indicated by two profiles 302-3 and 302-3 are mapped to and the total number of the physical blocks contained therein. It shall be appreciated that the values of the physical address of the starting physical block indicated by the record and the number of physical blocks shown in FIG. 3 are only illustrative, rather than limiting.

FIGS. 4-7 illustrate a method for checking address mapping, a method for modifying address mapping and a method for reclaiming profiles which are applicable to embodiments of the present disclosure.

Figure 4:
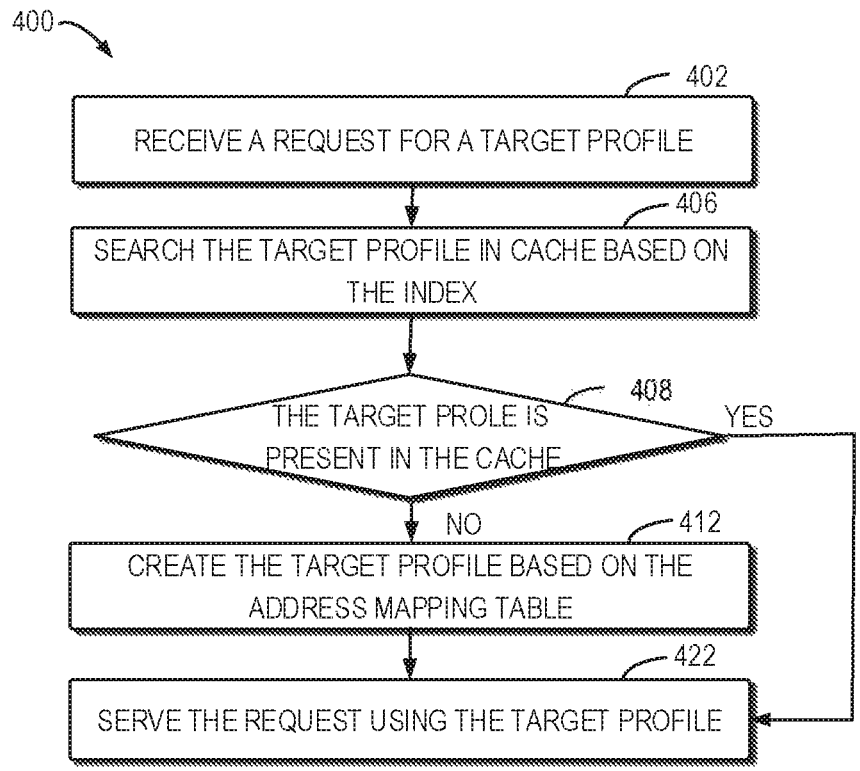
FIG. 4 is a flowchart illustrating a process or method for checking address mapping according to embodiments of the present disclosure.

FIG. 4 illustrates a flowchart of a process or a method 400 for looking up address mapping according to embodiments of the present disclosure. In some embodiments, in response to obtaining a request to check address mapping, the request is split into at least one sub-request based on the profile so that one sub-request will not straddle two profiles. The process or method 400 for checking address mapping is performed for each sub-request separately.

At 402, a request to a target profile is received.

At 406, the profile corresponding to the request is searched in cache 108 based on the index 3021.

At 408, it is determined whether the corresponding target profile exists in cache 108.

If the corresponding target profile exists in cache 108, then the process or method 400 comes to 422 where the profile is used for serving the sub-request.

If the corresponding profile does not exist in cache 108, then at 412, a target profile is created. In some embodiments, at 412, creating the target profile includes obtaining an address mapping table corresponding to the target profile from the non-volatile storage device 110. In some embodiments, if more than one target profiles are created, then these created target profiles will be stored in cache 108 in the order of the logical starting addresses.

In some embodiments, an index can be created for the target profile. It shall be appreciated that the above method for creating an index can be used for creating an index for the target profile.

At 422, the target profile can be utilized to serve the request.

As stated above, in some embodiments, in response to obtaining a request to check address mapping, the request is split into at least one sub-request based on the profile so that one sub-request will not straddle two profiles. The process or method 400 for checking address mapping is performed for each sub-request separately. In response to all the sub-requests being performed with the process or method 400 for checking address mapping, all the obtained results will be combined as a final result for the request.

Figure 5:
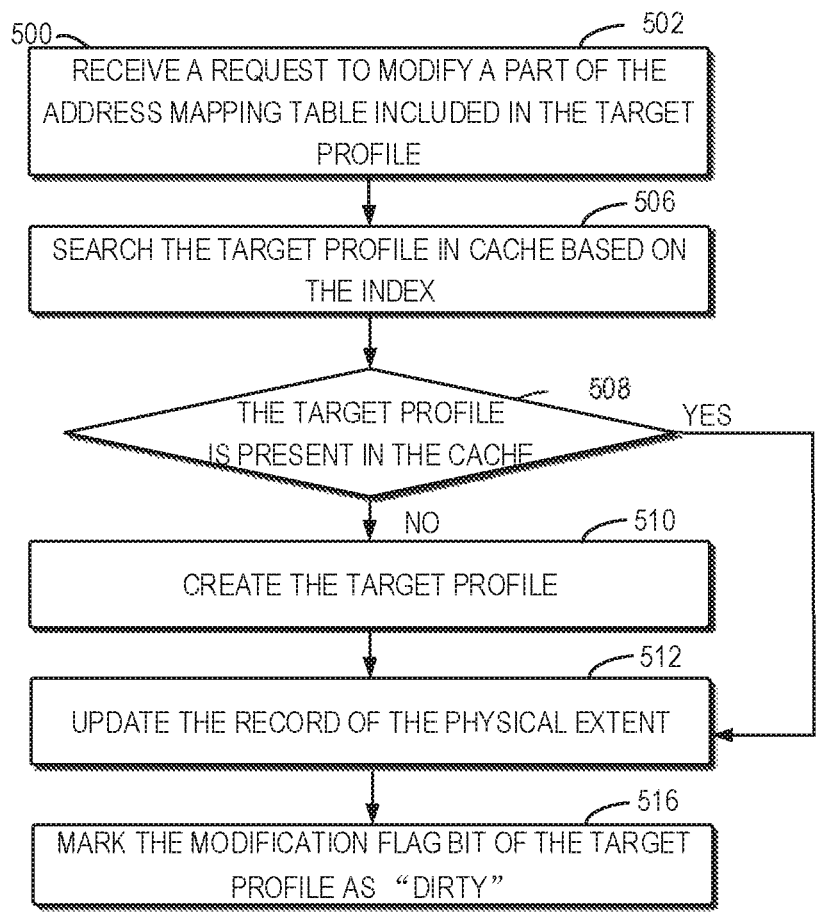
FIG. 5 is a flowchart illustrating a process or method for modifying address mapping according to embodiments of the present disclosure.

FIG. 5 is a flowchart illustrating a process or method 500 for modifying address mapping according to embodiments of the present disclosure. In some embodiments, in response to obtaining a request to modify address mapping, the request is split into at least one sub-request based on the profile so that one sub-request does not straddle two profiles. The process or method 500 for modifying address mapping is performed for each sub-request separately.

At 502, a request to modify a part of the address mapping table included in the target profile is received.

At 506, the target profile is searched in cache 108 based on the index.

At 508, it is determined whether the target profile exists in cache 108.

If the target profile exists in cache 108, then at 512, according to the target profile, a record of a physical extent associated with the profile is updated.

By way of example, in some embodiments, according to address mapping indicated by the target profile, the starting physical address inside the physical extent record and the number of physical blocks can be modified. In some embodiments, according to address mapping indicated by the profile, records of adjacent physical extents can be merged. In some embodiments, according to address mapping indicated by the profile, a physical extent record can also be split into a plurality of physical extent records.

If the target profile does not exist in cache 108, then at 510, a target profile is created. In some embodiments, an index for the target profile can be created. It shall be appreciated that the above method of creating an index can be employed to create an index of the target profile. In some embodiments, if more than one target profiles are created, then these created target profiles are stored in cache 108 in the order of the local starting addresses.

At 512, according to the created profile, the record for the physical extent associated with the target profile is updated. In some embodiments, according to address mapping indicated by the profile, the starting physical address in the record of the physical extent and the number of physical blocks can be modified. In some embodiments, according to the address mapping indicated by the profile, records of neighboring physical extents can be merged. In some embodiments, according to the address mapping indicated by the profile, a record of a physical extent can also be split into a plurality of physical extent records.

At 516, the modification flag bit of the target profile is marked as "dirty" to indicate that the target profile is changed with respect to the address mapping on a non-volatile storage device.

As stated above, in some embodiments, the request can be split into at least one sub-request based on the profile so that one sub-request will not straddle two profiles. The process or method 500 for modifying address mapping is performed for each sub-request separately until each sub-request is processed.

Figure 6:
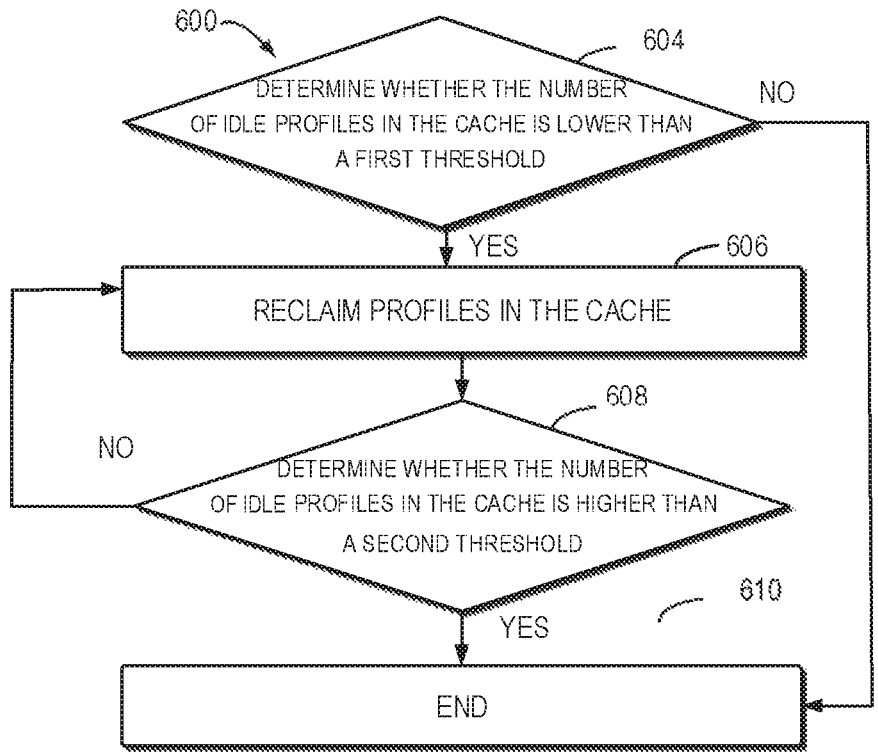
FIG. 6 is a flowchart illustrating a process or method for reclaiming storage space according to embodiments of the present disclosure.

FIG. 6 is a flowchart illustrating a process or method 600 for reclaiming storage space according to the embodiments of the present disclosure.

At 604, it is determined whether the number of idle profiles in cache 108 is lower than a first threshold. It shall be appreciated that those skilled in the art can configure a proper first threshold in practice. If the number of idle profiles in cache 108 is not lower than the first threshold, then reclaiming storage space will not be triggered, namely, it stops at 610 directly. If the number of idle profiles in cache 108 is lower than the first threshold, then reclaiming storage space will be triggered.

At 606, profiles in the cache are reclaimed. In some embodiments, if an index is created for the reclaimed profiles, then the index is removed. In some embodiments, profiles with the modification flag bit as "clean" can be reclaimed preferably.

In some embodiments, the profiles with the modification flag bit being "dirty" can be reclaimed. In some embodiments, after the address mapping indicated by the profiles with the modification flag bit as "dirty" are stored in the non-volatile storage device, the profiles are reclaimed. If an index is created for profiles with the modification flag bit as "dirty," then the index will be removed.

At 608, it is determined whether the number of idle profiles in cache 108 is higher than a second threshold. It shall be appreciated that those skilled in the art can configure a proper second threshold in practice. If the number of idle profiles in cache 108 is higher than the second threshold, then reclaiming profiles stops at 610 immediately. If the number of idle profiles in cache 108 is lower than the second threshold, profile reclaiming will continue.

Figure 7:
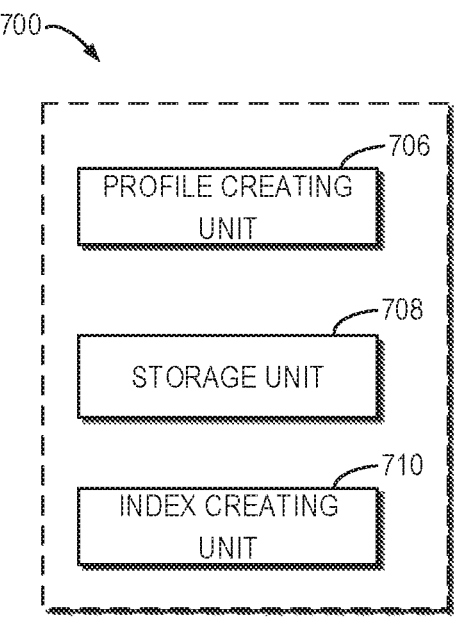
FIG. 7 is a schematic block diagram illustrating an apparatus for storage management according to embodiments of the present disclosure.

FIG. 7 is a schematic block diagram illustrating an apparatus 700 for storage management according to the embodiments of the present disclosure. The apparatus 700 can implement the embodiments of the present disclosure. As shown in the figure, the apparatus 700 includes a profile creating unit 706, a storage unit 708 and an index creating unit 710.

The profile creating unit 706 is configured to create a plurality of profiles for address mapping. A profile contains a part of address mapping tables stored on a non-volatile storage device and the profile indicates: a logical address of an initial logical block of a plurality of logical blocks, a physical starting address corresponding to the logical starting address, the number of a plurality of logical blocks, and a modification flag bit indicating whether the profile has been changed with respect to the address mapping table. The storage unit 708 is configured to store the plurality of profiles in the cache in an order of the corresponding logical starting address. The index creating unit 710 is configured to create an index for a part of the plurality of profiles in the cache.

In some embodiments, the index creating unit 710 is further configured to select a part of profiles randomly to create an index. In some embodiments, the index creating unit is further configured to select a part of profiles to create an index based on access frequency.

In some embodiments, the apparatus 700 may further includes a physical extent record creating unit 712 (not shown) which is configured to create a first record for a first physical extent. The first record indicates the physical starting address of the first physical extent and a first number of physical blocks contained therein. The first profile of a plurality of profiles indicates that at least a part of the plurality of logical blocks is mapped to the first physical extent. The physical extent record creating unit 712 is also configured to create a second record for a second physical extent. The second record indicates a physical starting address in the second physical extent and a second number of the physical blocks contained therein. The second profile of a plurality of profiles indicates at least a part of the plurality of logical blocks is mapped to the second physical extent. The physical extent record creating unit 712 is also configured to in response to the physical end address of the first physical extent and the physical starting address of the second physical extent being continuous, merge the first record and the second record to generate a third record, the third record indicating the physical starting address in the first physical extent and a sum of the first number and the second number; and store the third record in the cache. In some embodiments, the physical extent record creating unit 712 is further configured to: in response to the physical end address of the first physical extent and the physical starting address of the second physical extent being non-continuous, store the first record and the second record in the cache.

In some embodiments, the apparatus 700 further includes a searching unit 714 (not shown) configured to: receive a request for a target profile, the request indicating an index associated with the target profile and search the target profile in the cache based on the index. In some embodiments, the profile creating unit 706 is further configured to: in response to the target profile being absent in the cache, create a target profile based on the address mapping table.

In some embodiments, the apparatus 700 further includes a modifying unit 716 (not shown) configured to in response to the target profile being present in the cache, update the part of the address mapping table contained by the target profile.

In some embodiments, the apparatus 700 further includes a reclaiming unit 718 (not shown) configured to in response to the number of idle profiles in the cache being lower than the first threshold, trigger reclaiming of the plurality of profiles; in response to the number of idle profiles in the cache being higher than the second threshold, cease the reclaiming.

In some embodiments, the reclaiming unit 718 is further configured to: reclaim profiles not changed with respect to the address mapping table among the plurality of profiles. In some embodiments, the reclaiming unit 718 is further configured to: store, on a non-volatile storage device, the changed address mapping in the changed profiles. In some embodiments, the reclaiming unit 718 is further configured to remove the index of a reclaimed profile.

The units contained in the apparatus 700 can be implemented in various ways, including software, hardware, firmware, or any combination thereof. In some embodiments, one or more units may be implemented in software and/or firmware, for instance, machine-executable instructions stored on a storage medium. In addition to or instead of the machine-executable instructions, a part of or all the units in the apparatus 700 may be implemented at least in part by one or more hardware logic components. As an example, and without limitations, illustrative types of hardware logic components that can be used include a field programmable gate array (FPGA), an application specific integrated circuit (ASIC), application specific standard parts (ASSP), a system on chip (SOC), and a complex programmable logic device (CPLD), and the like.

Figure 8:
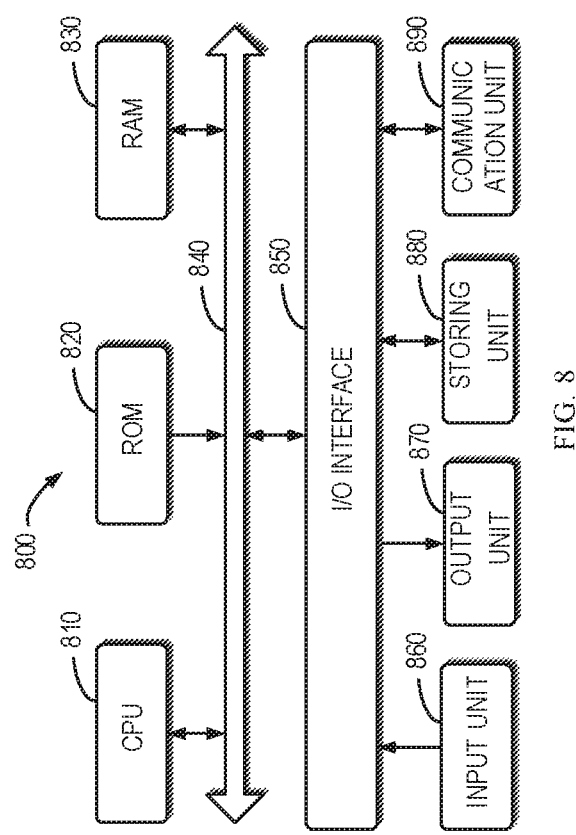
FIG. 8 is a schematic block diagram illustrating a device for storage management according to embodiments of the present disclosure.

FIG. 8 is a schematic block diagram illustrating an electronic device 800 suitable for implementing embodiments of the present disclosure. As indicated, the device 800 comprises a central processing unit (CPU) 801 which can execute various appropriate actions and processing based on the computer program instructions stored in a read-only memory (ROM) 802 or the computer program instructions loaded into a random access memory (RAM) 830 from a storage unit 880. The RAM 803 also stores all kinds of programs and data required by operating the storage device 800. CPU 810, ROM 820 and RAM 830 are connected to each other via a bus 840, to which an input/output (I/O) interface 850 is also connected.

A plurality of components in the device 800 are connected to the I/O interface 850, comprising: an input unit 860, such as keyboard, mouse and the like; an output unit 870, such as various types of displays, loudspeakers and the like; a storage unit 880, such as magnetic disk, optical disk and the like; and a communication unit 890, such as network card, modem, wireless communication transceiver and the like. The communication unit 890 allows the device 800 to exchange information/data with other devices through computer networks such as Internet and/or various telecommunication networks.

Each procedure and processing described above, such as method 200, 300, 400, 500 and 600, can be executed by a processing unit 810. For example, in some embodiments, the method 200, 300, 400, 500 and 600 can be implemented as computer software programs, which are tangibly included in a machine-readable medium, such as a storage unit 880. In some embodiments, the computer program can be partially or completely loaded and/or installed to the device 800 via ROM 820 and/or the communication unit 890. When the computer program is loaded to RAM 830 and executed by CPU 810, one or more steps of the above described method 200, 300, 400, 500 and 600 are implemented. Alternatively, in other embodiments, CPU 801 can also be configured to execute the above described process in any other suitable manner.

The present disclosure may be a method, an apparatus, a system and/or a computer program product. The computer program product can include a computer-readable storage medium loaded with computer-readable program instructions thereon for executing various aspects of the present disclosure.

The computer-readable storage medium can be a tangible device capable of holding and storing instructions used by the instruction-executing device. The computer-readable storage medium can be, but not limited to, for example electrical storage devices, magnetic storage devices, optical storage devices, electromagnetic storage devices, semiconductor storage devices or any random appropriate combinations thereof. More specific examples (non-exhaustive list) of the computer-readable storage medium comprise: portable computer disk, hard disk, random-access memory (RAM), read-only memory (ROM), erasable programmable read-only memory (EPROM or flash), static random access memory (SRAM), portable compact disk read-only memory (CD-ROM), digital versatile disk (DVD), memory stick, floppy disk, mechanical coding device, such as a punched card storing instructions or an emboss within a groove, and any random suitable combinations thereof. The computer-readable storage medium used herein is not interpreted as a transient signal itself, such as radio wave or other freely propagated electromagnetic wave, electromagnetic wave propagated through waveguide or other transmission medium (such as optical pulses passing through fiber-optic cables), or electric signals transmitted through electric wires.

The computer-readable program instructions described here can be downloaded from the computer-readable storage medium to various computing/processing devices, or to external computers or external storage devices via Internet, local area network, wide area network and/or wireless network. The network can comprise copper transmission cables, optical fiber transmission, wireless transmission, routers, firewalls, switches, gateway computers and/or edge servers. The network adapter or network interface in each computing/processing device receives computer-readable program instructions from the network, and forwards the computer-readable program instructions for storage in the computer-readable storage medium of each computing/processing device.

The computer program instructions for executing the operations of the present disclosure can be assembly instructions, instructions of instruction set architecture (ISA), machine instructions, machine-related instructions, microcode, firmware instructions, state setting data, or a source code or target code written by any combinations of one or more programming languages comprising object-oriented programming languages, such as Smalltalk, C++ and so on, and conventional procedural programming languages, such as "C" language or similar programming languages. The computer-readable program instructions can be completely or partially executed on the user computer, or executed as an independent software package, or executed partially on the user computer and partially on the remote computer, or completely executed on the remote computer or the server. In the case where a remote computer is involved, the remote computer can be connected to the user computer by any type of networks, including local area network (LAN) or wide area network (WAN), or connected to an external computer (such as via Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit can execute computer-readable program instructions to implement various aspects of the present disclosure.

Various aspects of the present disclosure are described in reference with the flow chart and/or block diagram of the method, apparatus (system) and computer program product according to the embodiments of the present disclosure. It should be understood that each block in the flow chart and/or block diagram and any combinations of various blocks thereof can be implemented by the computer-readable program instructions.

The computer-readable program instructions can be provided to the processing unit of a general purpose computer, a dedicated computer or other programmable data processing apparatuses to generate a machine, causing the instructions, when executed by the processing unit of the computer or other programmable data processing apparatuses, to generate a device for implementing the functions/actions specified in one or more blocks of the flow chart and/or block diagram. The computer-readable program instructions can also be stored in the computer-readable storage medium. These instructions enable the computer, the programmable data processing apparatus and/or other devices to operate in a particular way, such that the computer-readable medium storing instructions can comprise a manufactured article that includes instructions for implementing various aspects of the functions/actions specified in one or more blocks of the flow chart and/or block diagram.

The computer-readable program instructions can also be loaded into computers, other programmable data processing apparatuses or other devices, so as to execute a series of operational steps on the computers, other programmable data processing apparatuses or other devices to generate a computer implemented process. Therefore, the instructions executed on the computers, other programmable data processing apparatuses or other devices can realize the functions/actions specified in one or more blocks of the flow chart and/or block diagram.

The accompanying flow chart and block diagram present possible architecture, functions and operations realized by the system, method and computer program product according to a plurality of embodiments of the present disclosure. At this point, each block in the flow chart or block diagram can represent a module, a program segment, or a part of the instruction. The module, the program segment or the part of the instruction includes one or more executable instructions for implementing specified logic functions. In some alternative embodiments, the function indicated in the block can also occur in an order different from the one represented in the drawings. For example, two consecutive blocks actually can be executed in parallel, and sometimes they may also be executed in a reverse order depending on the involved functions. It should also be noted that each block in the block diagram and/or flow chart, and any combinations of the blocks thereof can be implemented by a dedicated hardware-based system for implementing specified functions or actions, or a combination of the dedicated hardware and the computer instructions.

Various embodiment of the present disclosure has been described above, and the above explanation is illustrative rather than exhaustive and is not limited to the disclosed embodiments. Without departing from the scope and spirit of each explained embodiment, many alterations and modifications are obvious for those ordinary skilled in the art. The selection of terms in the text aim to best explain principle, actual application or technical improvement in the market of each embodiment or make each embodiment disclosed in the text comprehensible for those ordinary skilled in the art.

We claim:

1. A method of storage management, comprising:
creating profiles for address mapping and storing the profiles in a cache, each profile containing a part of an address mapping table stored on a non-volatile storage device and indicating (1) a logical starting address of an initial logical block of a plurality of logical blocks, (2) a physical starting address corresponding to the logical starting address, and (3) the number of the plurality of logical blocks, the profiles being stored in the cache in an order of the corresponding logical starting addresses;
creating first and second records for respective first and second physical extents, each record indicating a physical starting address of the respective physical extent and number of physical blocks therein, at least a part of the plurality of logical blocks being indicated by first and second profiles each being mapped to the respective first and second physical extents; and
in response to a physical end address of the first physical extent and a physical starting address of the second physical extent being continuous, merging the first record and the second record to generate a third record and storing the third record in the cache, the third record indicating the physical starting address of the first physical extent and a sum of the numbers of physical blocks from the first and second records.

2. The method of claim 1, further including creating an index for a part of the plurality of profiles in the cache, comprising:
selecting the part of profiles randomly to create the index.

3. The method of claim 1, further including creating an index for a part of the plurality of profiles in the cache, comprising:
selecting, based on an access frequency, the part of profiles to create the index.

4. The method of claim 1, further comprising:
in response to the physical end address of the first physical extent and the physical starting address of the second physical extent being non-continuous, storing the first record and the second record in the cache.

5. The method of claim 1, further comprising:
receiving a request for a target profile, the request indicating an index associated with the target profile; and
searching the target profile in the cache based on the index.

6. The method of claim 5, further comprising:
in response to the target profile being absent in the cache, creating the target profile based on the address mapping table.

7. The method of claim 6, wherein the request comprises a request to modify a part of the address mapping table contained in the target profile, and the method further comprises:
in response to the target profile being present in the cache, updating the part of the address mapping table contained in the target profile.

8. The method of claim 1, further comprising:
in response to the number of idle profiles in the cache being lower than a first threshold, triggering reclaiming of the plurality of profiles; and
in response to the number of idle profiles in the cache being greater than a second threshold, ceasing the reclaiming.

9. The method of claim 8, wherein triggering reclaiming of the plurality of profiles comprises:
reclaiming, among the plurality of profiles, profiles not having been changed with respect to the address mapping table.

10. The method of claim 8, wherein triggering reclaiming of the plurality of profiles comprises:
reclaiming, among the plurality of profiles, profiles having been changed with respect to the address mapping table, comprising:
storing, in the non-volatile storage device, changed address mapping in the changed profiles.

11. The method of claim 8, further comprising:
removing an index of a reclaimed profile.

12. An electronic device, comprising:
a processor; and
a memory coupled to the processor, the memory having instructions stored therein which, when executed by the processor, cause the electronic device to perform acts comprising:
creating profiles for address mapping and storing the profiles in a cache, each profile containing a part of an address mapping table stored on a non-volatile storage device and indicating (1) a logical starting address of an initial logical block of a plurality of logical blocks, (2) a physical starting address corresponding to the logical starting address, and (3) the number of the plurality of logical blocks, the profiles being stored in the cache in an order of the corresponding logical starting addresses;
creating first and second records for respective first and second physical extents, each record indicating a physical starting address of the respective physical extent and number of physical blocks therein, at least a part of the plurality of logical blocks being indicated by first and second profiles each being mapped to the respective first and second physical extents; and
in response to a physical end address of the first physical extent and a physical starting address of the second physical extent being continuous, merging the first record and the second record to generate a third record and storing the third record in the cache, the third record indicating the physical starting address of the first physical extent and a sum of the numbers of physical blocks from the first and second records.

13. The device of claim 12, wherein the acts further include creating an index for a part of the plurality of profiles in the cache, comprising:
selecting the part of profiles randomly to create the index.

14. The device of claim 12, wherein the acts further include creating an index for a part of the plurality of profiles in the cache, comprising:
- selecting, based on an access frequency, the part of profiles to create the index.

15. The device of claim 12, wherein the acts further comprise:
- in response to the physical end address of the first physical extent and the physical starting address of the second physical extent being non-continuous, storing the first record and the second record in the cache.

16. The device of claim 12, wherein the acts further comprise:
- receiving a request for a target profile, the request indicating an index associated with the target profile;
- searching the target profile in the cache based on the index.

17. The device of claim 16, wherein the acts further comprise:
- in response to the target profile being absent in the cache, creating the target profile based on the address mapping table.

18. The device of claim 17, wherein the request comprises a request to modify a part of the address mapping table contained in the target profile, and the acts further comprise:
- in response to the target profile being present in the cache, updating the part of the address mapping table contained in the target profile.

19. The device of claim 12, wherein the acts further comprise:
- in response to the number of idle profiles in the cache being lower than a first threshold, triggering reclaiming of the plurality of profiles;
- in response to the number of idle profiles in the cache being greater than a second threshold, ceasing the reclaiming.

20. The device of claim 12, wherein the acts further comprise:
- reclaiming, among the plurality of profiles, profiles not having been changed with respect to the address mapping table.

* * * * *